United States Patent
Masuoka et al.

(10) Patent No.: US 9,108,267 B2
(45) Date of Patent: Aug. 18, 2015

(54) PULSE ELECTRIC-CURRENT BONDING METHOD AND PULSE ELECTRIC-CURRENT BONDING APPARATUS

(75) Inventors: Tadashi Masuoka, Kakuda (JP); Akinaga Kumakawa, Kakuda (JP); Shin-ichi Moriya, Kakuda (JP); Tomohiro Sato, Nagaoka (JP); Shinichi Takei, Nagaoka (JP)

(73) Assignee: Japan Aerospace Exploration Agency, Tokyo (JP)

( * ) Notice: Subject to any disclaimer, the term of this patent is extended or adjusted under 35 U.S.C. 154(b) by 710 days.

(21) Appl. No.: 13/041,331

(22) Filed: Mar. 4, 2011

(65) Prior Publication Data
US 2012/0024825 A1 Feb. 2, 2012

(30) Foreign Application Priority Data
Jul. 27, 2010 (JP) ................ 2010-168351

(51) Int. Cl.
*B23K 11/00* (2006.01)
*B23K 11/24* (2006.01)
*B23K 11/16* (2006.01)

(52) U.S. Cl.
CPC ............ *B23K 11/241* (2013.01); *B23K 11/002* (2013.01)

(58) Field of Classification Search
CPC ...... B23K 11/002; B23K 11/14; B23K 11/20; B23K 11/241
USPC ............ 219/78.01, 86.22–86.24, 117.1, 118, 219/108
See application file for complete search history.

(56) References Cited

U.S. PATENT DOCUMENTS

| | | | | |
|---|---|---|---|---|
| 3,784,779 A * | 1/1974 | Schaitberger | ............ | 219/78.02 |
| 5,613,299 A * | 3/1997 | Ring et al. | ................ | 29/890.01 |
| 6,164,060 A * | 12/2000 | Myers et al. | ................... | 60/253 |
| 6,933,459 B2 * | 8/2005 | Helder et al. | ............ | 219/117.1 |
| 2010/0139840 A1 * | 6/2010 | Allemand et al. | ........ | 156/89.11 |

FOREIGN PATENT DOCUMENTS

JP  2007-253240  10/2007

* cited by examiner

*Primary Examiner* — Tu B Hoang
*Assistant Examiner* — Michael Hoang
(74) *Attorney, Agent, or Firm* — Blakely, Sokoloff, Taylor & Zafman LLP

(57) ABSTRACT

A pressure surface of a first metal material for receiving a pressure therethrough is fabricated to have a directional component parallel to a pressure-application direction and a directional component perpendicular to the pressure-application direction, and an electrically-conductive core is fabricated to have a surface along the pressure surface and a surface perpendicular to the pressure-application direction. An assembly comprising the first metal material, the second metal material and the core is set in a pulse electric-current bonding unit to perform a pulse electric-current bonding process.

7 Claims, 7 Drawing Sheets

PULSE ELECTRIC-CURRENT BONDING METHOD AND PULSE ELECTRIC-CURRENT BONDING APPARATUS

TECHNICAL FIELD

The present invention relates to a technique for bonding materials by a pulse electric-current bonding process, and more particularly to an enhancement to bonding strength between an inner shell and an outer shell.

BACKGROUND

As one technique for bonding two metal materials, there has been known an electroforming process (metal product production or reproduction technique based on an electroplating process). However, the electroforming process requires a fairly long time for forming an electroformed layer (plated layer), which leads to an increase in cost. Therefore, as a technique for bonding two metal materials, a pulse electric-current bonding process (also called "SPS (Spark Plasma Sintering) process") as disclosed in the following Patent Document 1 is often employed. The pulse electric-current bonding process is designed to bond two metal materials together by causing an electric current to flow through the metal materials so as to heat them, while applying a load thereto. Thus, the bonding between the metal materials can be achieved in a short period of time and at a low cost, as compared with the electroforming process.

PRIOR ART PATENT DOCUMENTS

[Patent Document 1] JP 2007-253240A

FIG. 1 shows a conventional pulse electric-current bonding technique. As shown in FIG. 1, two metal materials as target members are interposed between a pair of electrodes (paired electrodes). Each of the paired electrodes is connected to a voltage source adapted to generate a pulse voltage. The two metal materials are bonded together by applying the pulse voltage between the paired electrodes to cause an electric current to flow through the two metal materials so as to generate heat therein, while applying a pressure to the two metal materials in a direction perpendicular to boding surfaces of the two metal materials, through the paired electrodes.

In the conventional pulse electric-current bonding technique, when the pressure-application direction can be set to be perpendicular to the bonding surfaces, high bonding strength is obtained. However, for example, in a two-layered cylinder illustrated in FIG. 2, the pressure can be applied only in a direction parallel (or oblique) to bonding surfaces between inner and outer cylinders. In this case, a degree of close contact between the bonding surfaces becomes lower, resulting in poor bonding strength.

SUMMARY

In view of the above problem in the conventional pulse electric-current bonding technique, it is an object of the present invention to provide a method and apparatus capable of enhancing bonding strength between bonding surfaces parallel (or oblique) to a pressure-application direction.

In order to achieve the above object, the present invention provides a pulse electric-current bonding method for bonding first and second metal materials whose bonding surfaces have a directional component parallel to a pressure-application direction. The pulse electric-current bonding method comprises the steps of: fabricating a pressure surface of the first metal material for receiving a pressure therethrough, to have a directional component parallel to the pressure-application direction and a directional component perpendicular to the pressure-application direction; fabricating a core which has an electrical conductivity less than those of the first and second metal materials, to have a surface along the pressure surface and a surface perpendicular to the pressure-application direction; assembling the first metal material, the second metal material and the core, together with an electrically-conductive elastic member having a contact surface perpendicular to the pressure-application direction, to allow the contact surface to come into contact with the core; fixing the second metal material in a direction perpendicular to the pressure-application direction; preparing a pulse electric-current bonding unit which comprises: a pair of electrodes; a pressure-applying device for applying a pressure to at least one of the paired electrodes while setting the pressure-application direction to a direction connecting between the paired electrodes; and a voltage source for applying a pulse voltage between the paired electrodes, and interposing the assembly comprising the first metal material, the second metal material, the core and the elastic member, between the paired electrodes; and applying the pulse voltage between the paired electrodes by the voltage source, while applying the pressure to at least one of the paired electrodes by the pressure-applying device, to bond the first metal material and the second metal material together.

The pulse electric-current bonding method of the present invention may further comprise, after the step to bond, the steps of: detaching the bonded first and second metal materials from the pulse electric-current bonding unit and the core; and fabricating the pressure surface of the first metal material into a desired shape.

Preferably, in the pulse electric-current bonding method of the present invention, after the assembling and before the bonding, a part of the core is located closer to each of the paired electrodes than the first and second metal materials, in the pressure-application direction, and an electrically-conductive elastic sheet is provided between each of the paired electrodes and at least one of the first and second metal materials.

Preferably, in the pulse electric-current bonding method of the present invention, the step to bond is performed within a vacuum furnace.

Preferably, the pulse electric-current bonding method of the present invention, the step of fixing includes attaching a fixing member to a surface of the second metal material on a side opposite to the bonding surface thereof in a direction perpendicular to the pressure-application direction.

More preferably, the fixing member is adapted to be electrically heatable, wherein the step to bond includes performing the bonding while measuring a temperature of the first or second metal materials, and causing an electric current to flow through the fixing member, depending on the measured temperature, so as to keep the temperature of the first or second metal material constant.

The fixing member may be made of hard graphite. Further, in the pulse electric-current bonding method of the present invention, the elastic member may be made of elastic graphite, and the core may be made of hard graphite.

The present invention further provides a pulse electric-current bonding apparatus for bonding first and second metal materials whose bonding surfaces have a directional component parallel to a pressure-application direction. The pulse electric-current bonding apparatus comprises: a pair of electrodes; a pressure-applying device for applying a pressure to at least one of the paired electrodes while setting the pressure-application direction to a direction connecting between the paired electrodes; a voltage source for applying a pulse voltage between the paired electrodes; and an electrically-conductive elastic member. A core and the electrically-conductive elastic member are disposed between the paired electrodes in such a manner that the electrically-conductive elastic member comes into contact with the core through a contact surface thereof perpendicular to the pressure-application direction, and the core has a shape allowing a contact surface thereof with the first metal material to have a directional component parallel to the pressure-application direction and a directional component perpendicular to the pressure-application direction, have an electrical conductivity less than those of the first and second metal materials. Further, the second metal material is fixed in a direction perpendicular to the pressure-application direction.

The present invention makes it possible to enhance bonding strength in a pulse electric-current bonding technique for bonding between bonding surfaces parallel (or oblique) to the pressure-application direction. In addition, the present invention allows a pulse electric-current bonding technique to be used even in bonding between bonding surfaces having complicated shapes. For example, the present invention makes it possible to achieve bonding for a two-layered cylinder, i.e., bonding between inner and outer cylinders or curved bonding surfaces.

DETAILED DESCRIPTION

With reference to the drawings, a pulse electric-current bonding method and apparatus of the present invention will now be described based on various embodiments thereof.

Figure 2:
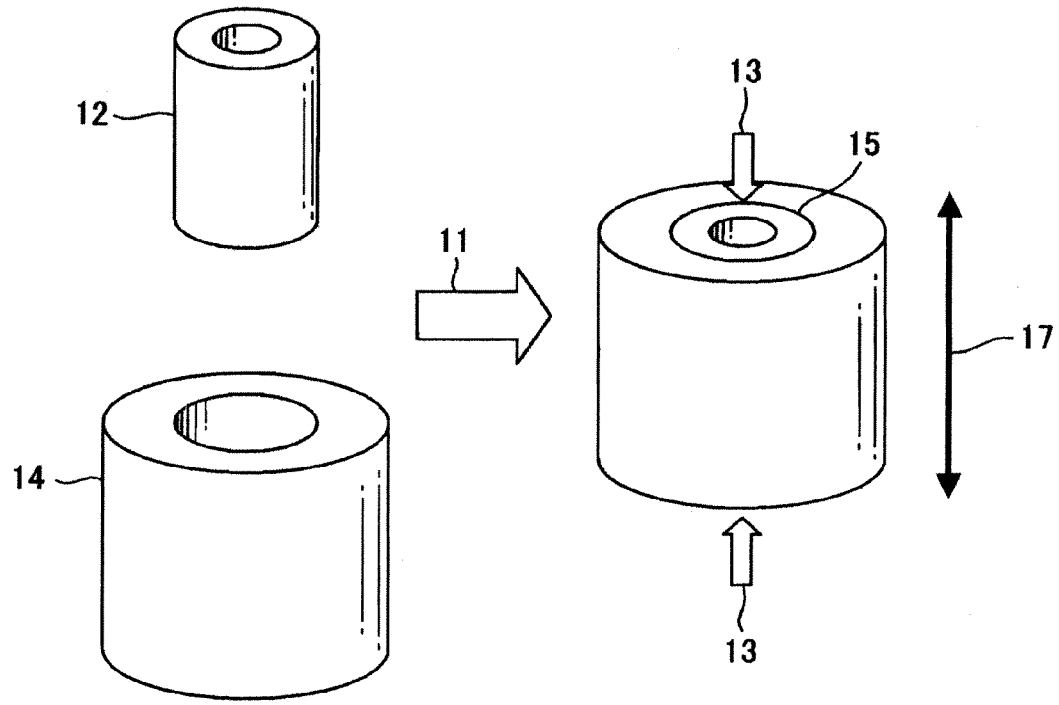
FIG. 2 is a schematic diagram showing one example of target members to be bonded together by a pulse electric-current bonding technique according to the present invention (a two-layered cylinder).
Figure 3:
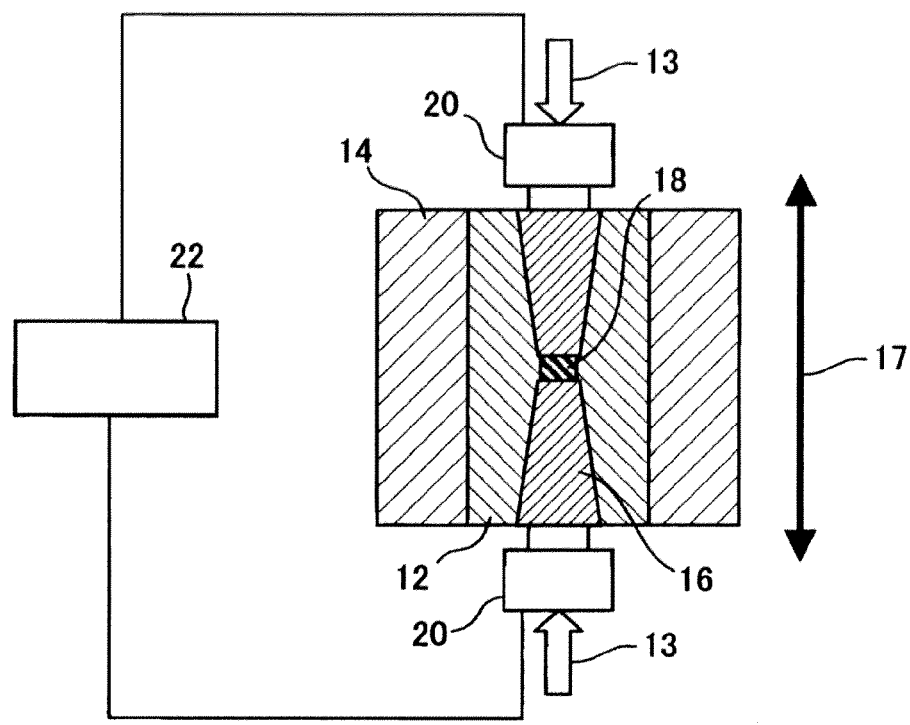
FIG. 3 is a sectional view schematically showing a pre-bonding assembly in one embodiment of the present invention.

The following description on the embodiments of the present invention will be made by taking a two-layered cylinder (see FIG. 2) as an example of target members. FIG. 3 is a sectional view showing a pre-bonding assembly in a first embodiment of the present invention. The target members are two hollow cylindrical-shaped metal materials which are different in size. Specifically, in a state after a small cylindrical metal material (inner cylinder) 12 is inserted into a large cylindrical metal material (outer cylinder) 14, an outer peripheral surface of the inner cylinder 12 and an inner peripheral surface of the outer cylinder 14 will be bonded together. A pair of cores 16 are inserted into the inner cylinder 12. Further, an elastic member 18 is interposed between the cores 16. Then, a pressure is applied to the cores 16 through respective ones of a pair of electrode (paired electrodes) 20 of a pulse electric-current bonding unit, in a direction toward a central region of an inner bore of the inner cylinder 12, and simultaneously a pulse voltage generated by a pulse generator 22 is applied between the paired electrodes 20. In order to allow an electric current to flow through the inner and outer cylinders 12, 14 as well as the cores 16, during the voltage application, an electrical conductivity of each of the inner and outer cylinders 12, 14 may be set to be less than that of the cores 16. In this manner, the respective outer and inner peripheral surfaces (bonding surfaces) of the inner and outer cylinders 12, 14 are bonded together.

Figure 1:
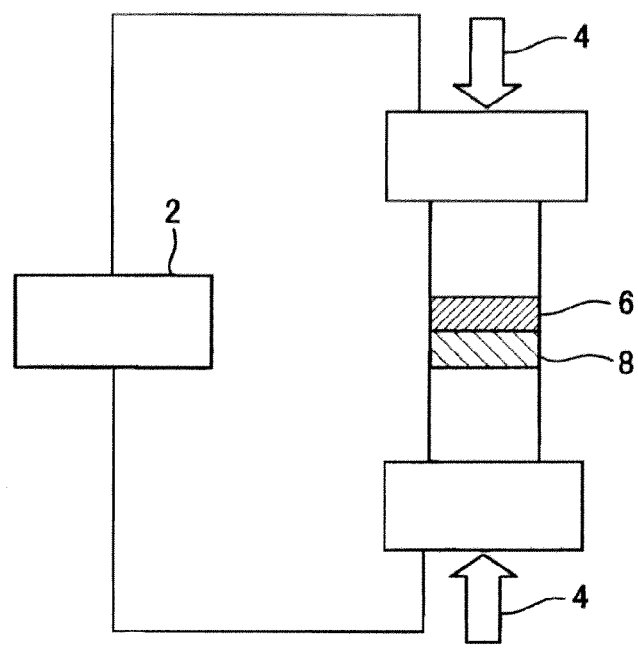
FIG. 1 is an explanatory diagram showing a conventional pulse electric-current bonding technique.
Figure 4:
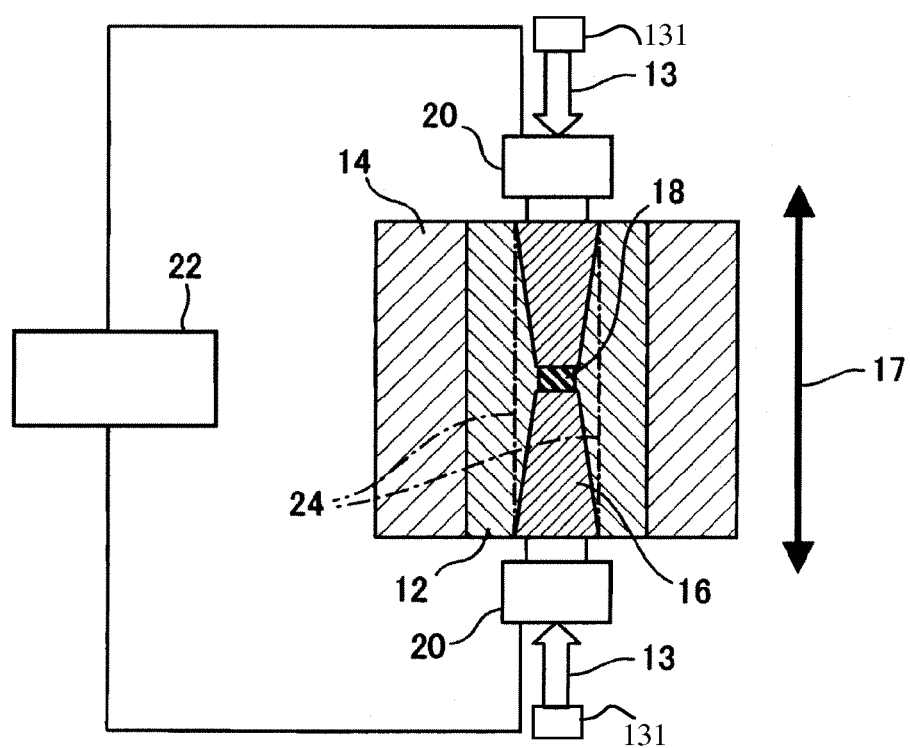
FIG. 4 is a sectional view prepared by adding a re-fabrication line to FIG. 3.

More specifically, firstly, an inner peripheral surface of the inner cylinder 12 is inversely tapered, specifically, formed to have a pair of inversely tapered regions along an axial direction thereof, as shown in FIG. 1. In other words, the inner peripheral surface of the inner cylinder 12 is fabricated to have both of a directional component perpendicular to the pressure-application direction and a directional component parallel to the pressure-application direction. For example, each of the tapers may be a linear taper, a parabolic taper or an exponential taper. After completion of the bonding, the inner cylinder 12 may be re-fabricated into a desired shape. However, in cases where a final shape (desired shape) of the inner peripheral surface of the inner cylinder has both of a directional component parallel to the pressure-application direction and a directional component perpendicular to the pressure-application direction, the inner peripheral surface of the inner cylinder may be initially formed into the final shape in advance of the bonding, to omit the re-fabrication. For example, the re-fabrication may be performed by means of cutting along a re-fabrication line 24 in FIG. 4.

Then, each of the cores 16 is fabricated in conformity to the inner peripheral surface of the inner cylinder 12. Further, each of the cores 16 is formed to have an outer-end surface perpendicular to the pressure-application direction, and disposed to come into contact with a respective one of the paired electrodes 20 through the outer-end surface so as to receive a pressure from the respective one of the paired electrodes 20 pressed by a pressure-applying device 131. In order to allow each of the cores 16 to reliably transmit the pressure received from the respective one of the paired electrodes 20 in the pressure-application direction, to the inner cylinder 20, the core 16 may be formed to have an outer diameter greater than an inner diameter of the inner cylinder 20. The first embodiment in FIG. 3 is shown as one example where the number of cores 16 is two. Alternatively, the number of cores 16 may be one. In this case, the inner peripheral surface of the inner cylinder 12 may be inversely tapered over an approximately overall length thereof, and one of the paired electrodes 20 may be fixed.

After completion of the fabrication of the cores 16 and the inner cylinders 12, the cores 16, the inner cylinder 12, the outer cylinder 14 and the elastic member 18 are assembled together, as shown in FIG. 3. In the assembled state, the elastic member 18 is in contact with respective inner ends of the cores 16. The elastic member 18 is incorporated to ensure a space for allowing each of the cores 16 to be displaced by a pressure applied thereto. Therefore, the contact surface of the elastic member 18 with each of the cores 16 is set to be perpendicular to the pressure-application direction. The elastic member 18 has an electrical conductivity, and serves as a current pathway during the pulse electric-current bonding process. Typically, as with the cores, the electrical conductivity of the elastic member 18 is set to be less than that of each of the inner and outer cylinders 12, 14.

Figure 5:
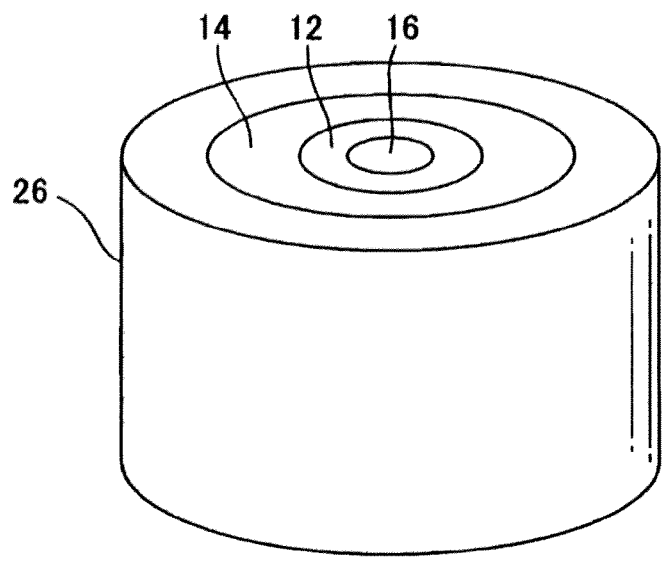
FIG. 5 is a schematic diagram showing the pre-bonding assembly in the above embodiment, wherein an outer cylinder is covered by a fixing member.

In the first embodiment, the outer cylinder 14 is less likely to be displaced in a direction perpendicular to the pressure-application direction, because it has a cylindrical shape. However, a fixing member 26 may be attached thereto to reliably prevent the displacement in the perpendicular direction. Specifically, even in cases where the outer cylinder 14 is less likely to be displaced in a direction perpendicular to the pressure-application direction, as in the first embodiment, elongation and thermal expansion (substantial displacement) can occur therein. Thus, the fixing member 26 may be attached thereto to prevent such elongation and thermal expansion. In the first embodiment, as shown in FIG. 5, the fixing member 26 may be formed in a hollow, cylindrical shape, and attached around the outer cylinder 14, according to need.

The assembly comprising the cores 16, the inner cylinder 12, the outer cylinder 14 and the elastic member 18 and optionally the fixing member 26 is set in the pulse electric-current bonding unit. The pulse electric-current bonding unit comprises the paired electrodes 20, the pressure-applying device (not shown), and the pulse generator (pulse voltage source) 22. The assembly is interposed between the paired electrodes 20, and a pulse voltage is applied between the paired electrodes 20 by the pulse generator 22 connected to the paired electrodes 20, whereby the inner cylinder 12 and the outer cylinder 14 are bonded together. During the application of the pulse voltage, each of the paired electrodes 20 is pressed by the pressure-applying device, and thereby each of the cores 16 is pressed in the pressure-application direction through a respective one of the paired electrodes 20. The contact surfaces between the inner cylinder 12 and each of the cores 16 are disposed obliquely with respect to the pressure-application direction. Thus, when the cores 16 are pressed in the pressure-application direction, the inner cylinder 12 receives a force having a directional component perpendicular to the pressure-application direction, from the cores 16, so that a force is perpendicularly applied to the contact surfaces (bonding surfaces) between the inner and outer cylinders 12, 14, which provide a higher degree of close contact between the bonding surfaces. Consequently, bonding strength between the inner and outer cylinders 12, 14 is enhanced.

After completion of the bonding, the bonded inner and outer cylinders 12, 14 are detached from the pulse electric-current bonding unit and the cores 16. In cases where the assembly includes the fixing member, the bonded inner and outer cylinders 12, 14 are further detached from the fixing member. Then, the inner peripheral surface of the inner cylinder 12 may be fabricated into a desired shape.

Figure 6:
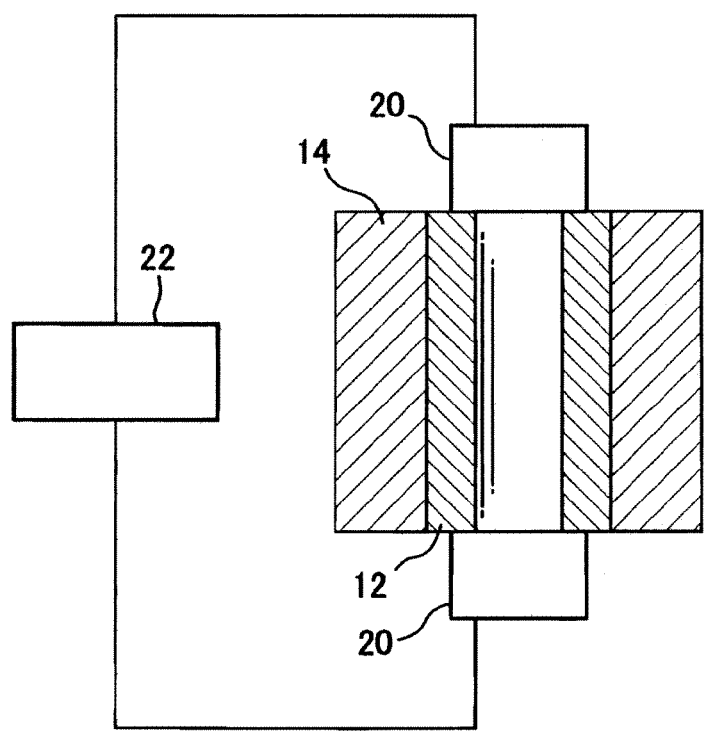
FIG. 6 illustrates a pre-bonding assembly to be used when a two-layered cylinder is bonded by a conventional pulse electric-current bonding technique.
Figure 7A:
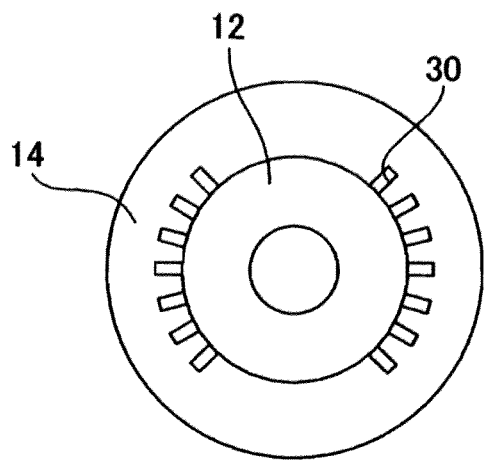
FIG. 7A is a sectional view of target members for use in experimental measurement of bonding strength.
Figure 7B:
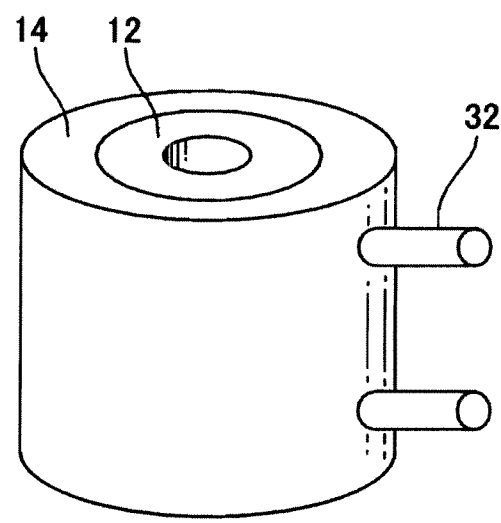
FIG. 7B is a perspective view of the target embers for use in the experimental measurement of bonding strength.

The bonding strength may be experimentally measured, for example, in the following manner. Firstly, a first specimen comprised of inner and outer cylinders 12, 14 bonded together by the technique according to the present invention, and a second specimen comprised of inner and outer cylinders 12, 14 bonded together by a conventional technique as shown in FIG. 6, are prepared. Then, a groove 30 is formed in an inner peripheral surface of the outer cylinder 14 as shown in the sectional view of FIG. 7A, and a hole is formed in the outer cylinder 14 to have one end communicated with the groove 30 and the other end opened in an outer peripheral surface of the outer cylinder 14. A valve 32 is attached to the other end of the hole to inject water into the groove 30. The first and second specimens are prepared under the same conditions, such as material and size, except for a bonding technique. Water is continuously injected into the groove 30 via the valve 32 to gradually raise a water pressure until peeling between the inner and outer cylinders 12, 14 occurs. Based on a value of the water pressure at a timing of the peeling, the bonding strength can be evaluated.

As one example, an outer cylinder 14 made of SUS (stainless steel), and an inner cylinder 12 made of a copper alloy (e.g., Cu—Cr—Zr alloy), were bonded together to prepare a specimen having an outer diameter of 168 mm, an inner diameter of 113 mm and a height of 150 mm, and an experimental test was carried out using the specimen. A plurality of grooves 30 each having a width of about 2 mm were bored inside the specimen, and a non-grooved area was provided at intervals of 90 degrees. If peeling between the inner and outer cylinders 12, 14 occurs, the specimen will be deformed. Thus, the peeling was measured using a strain gauge.

As a result, in the specimen bonded by the conventional technique, the peeling was detected at a water pressure of 26.2 MPa, whereas, in the specimen bonded by the technique according to the present invention, a value of the water pressure at a detection timing of the peeling was 47.1 MPa. The test result shows that the present invention makes it possible to increase the bonding strength to a fairly high level, as compared with the conventional technique.

Figure 8:
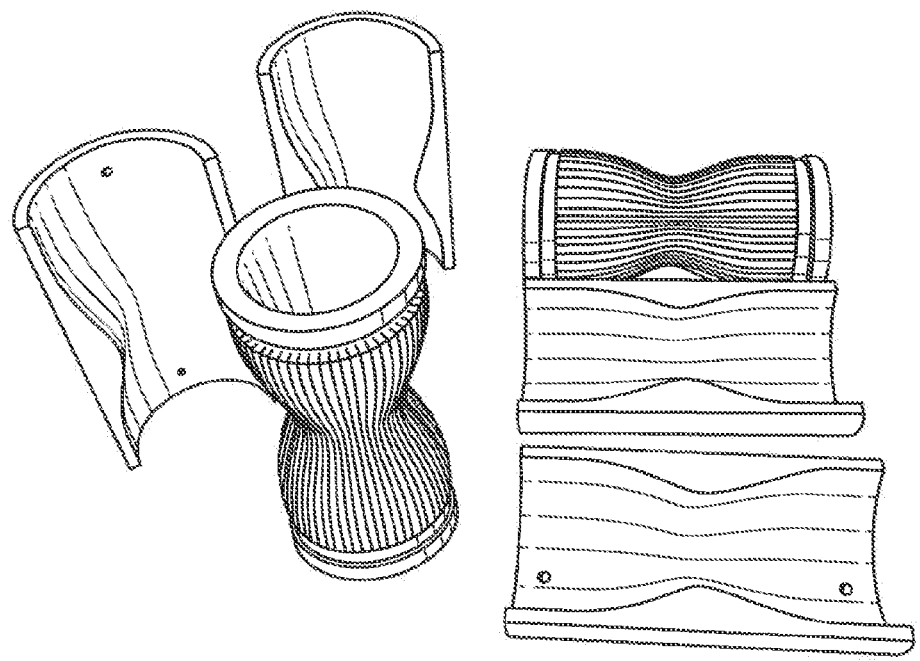
FIG. 8 is a photograph showing target members having a rocket combustor configuration.
Figure 9:
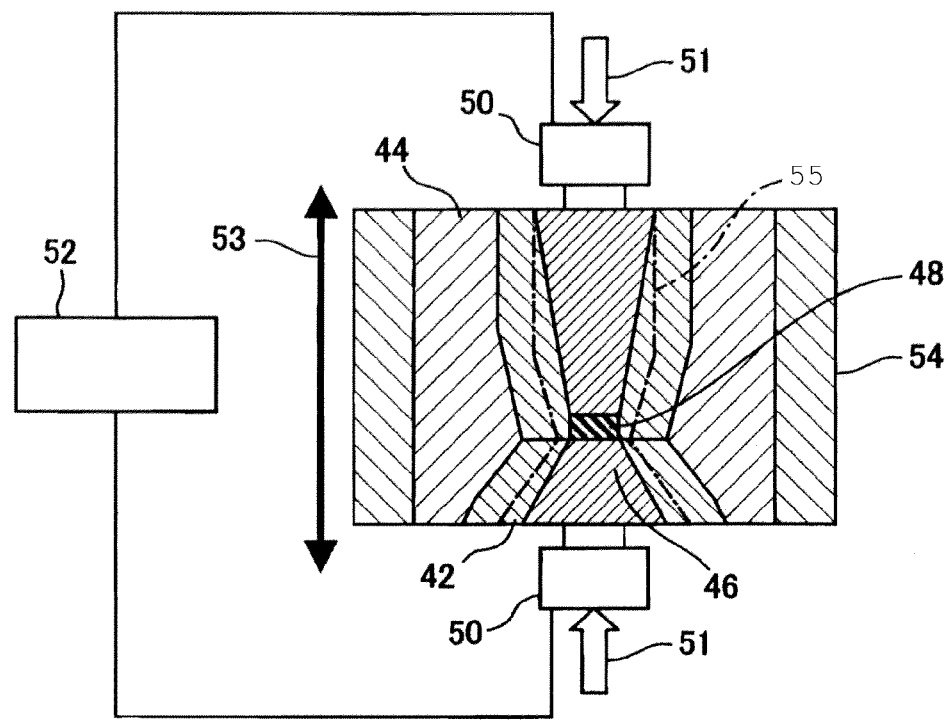
FIG. 9 is a sectional view showing a pre-bonding assembly for a rocket combustor configuration.

A second embodiment of the present invention will be described below, wherein the target members have a rocket combustor configuration. FIG. 8 is a photograph showing the target members, and FIG. 9 is a sectional view showing a pre-bonding assembly in the second embodiment. In the rocket combustor configuration, bonding surfaces between an inner cylinder 42 and an outer cylinder 44 are complicated. The inner cylinder 42 is preliminarily formed to have an inner peripheral surface with a conical inclination. For example, an assembly comprised of the inner cylinder 42, the outer cylinder 44, two cores 46, an elastic member 48 and a fixing member 54, is formed in the following manner. Firstly, one of the cores 46, and the other core 46 with the elastic member 48, are inserted into the inner cylinder 42 along respective opposite components of a pressure-application direction. Due to the complicated bonding surfaces, the outer cylinder 44 cannot be assembled to the inner cylinder 42 in its original configuration. Therefore, the outer cylinder 44 is assembled to the inner cylinder 41 by: cutting the outer cylinder 44 vertically (along the pressure-applying direction) into two pieces; fitting the two outer-cylinder pieces onto the inner cylinder 42; and weldingly connecting respective cut portions of the outer-cylinder pieces together. Then, the fixing member 48 is assembled to the outer cylinder 44 in such a manner as to cover an outer peripheral surface of the outer cylinder 44. The outer cylinder 44 is made of SUS (stainless steel), and the inner cylinder 42 is made of a copper alloy. Each of the cores 46 and the fixing member 54 may be made of (hard) graphite. A flexible graphite sheet may be used as the elastic member 48.

The assembly comprised of the inner cylinder 42, the outer cylinder 44, the cores 46, the elastic member 48 and the fixing member 54 is interposed between a pair of electrodes (pared electrodes) 50 of a pulse electric-current bonding unit, and the inner cylinder 42 and the outer cylinder 44 are bonded together by applying a pulse voltage between the paired electrodes 50, while applying a pressure to the paired electrodes 50 by a pressure-applying device (not shown). After completion of the bonding, the bonded inner and outer cylinders 42, 44 are detached from the pulse electric-current bonding unit, the cores 46, the elastic member 48 and the fixing member 54. After detaching the bonded inner and outer cylinders 42, 44, the inner peripheral surface of the inner cylinder 42 is fabricated along a re-fabrication line 55 in FIG. 9 into a rocket combustor configuration, by cutting.

In a third embodiment of the present invention, the pulse electric-current bonding unit comprise a vacuum furnace. In this case, the bonding may be performed under a condition that an assembly comprising an inner cylinder, an outer cylinder, one or more cores and an elastic member is interposed between a pair of electrodes (paired electrodes) disposed in the vacuum furnace.

Figure 10:
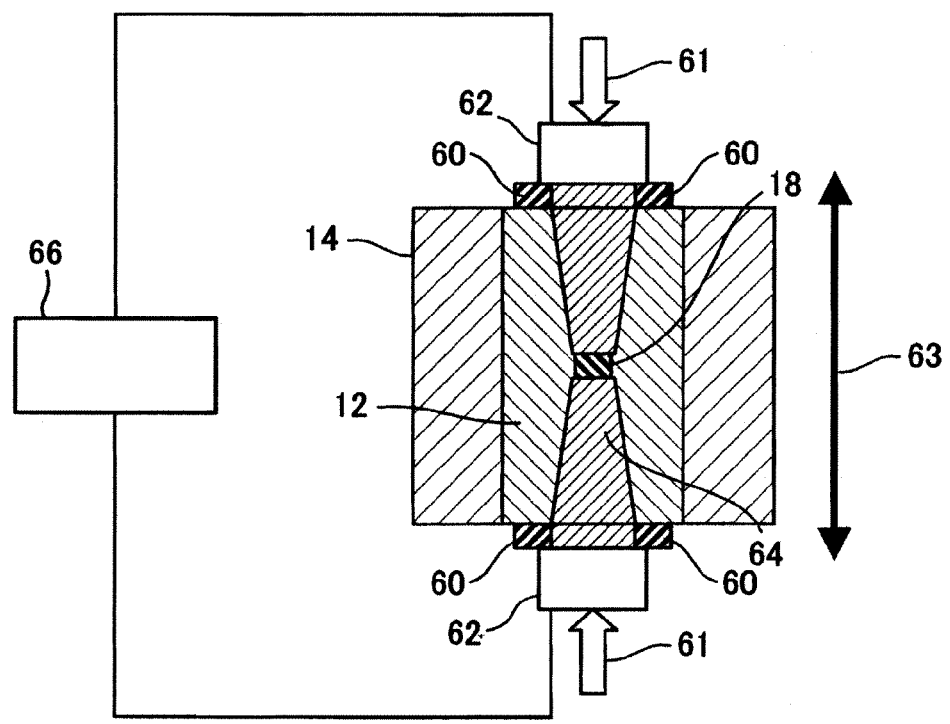
FIG. 10 is a schematic sectional view showing a pre-bonding assembly which employs an elastic member provided between an inner cylinder and each of paired electrodes, in another embodiment of the present invention.

In a fourth embodiment of the present invention illustrated in FIG. 10, each of a pair of cores 64 is formed to extend closer to a respective one of a pair of electrodes (paired electrodes) 62 than an inner cylinder 12, to define a space between at least one of the inner cylinder 12 and an outer cylinder 14 (i.e., the inner cylinder 12 or the outer cylinder 14, or each of the inner and outer cylinders 12, 14) and the respective one of the paired electrodes 62, wherein an elastic member 60, such as a flexible (elastic) graphite sheet, is inserted in the space.

Figure 11:
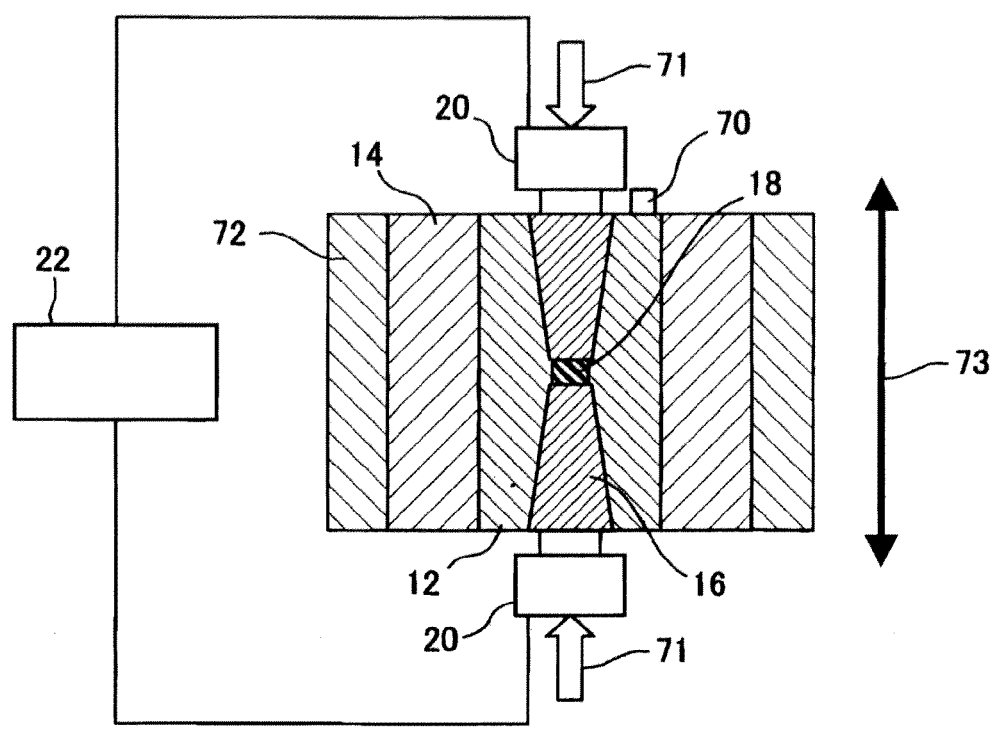
FIG. 11 is a schematic sectional view showing a pre-bonding assembly for controlling a temperature of target members, in yet another embodiment of the present invention.

In a fifth embodiment of the present invention illustrated in FIG. 11, at least one of an inner cylinder 12 and an outer cylinder 14 is adapted to be temperature-controlled so as to allow the inner and outer cylinders 12, 14 to be uniformly bonded together. Specifically, an electrically heatable fixing member 72 is attached onto the outer cylinder 14, and a temperature of at least one of the inner cylinder 12 and the outer cylinder 14 is measured. Then, when the measured temperature is greater than a predetermined value, an amount of electric current flowing through the electrically-conductive fixing member 72 is reduced to lower the temperature. On the other hand, when the measured temperature is less than the predetermined value, the amount of electric current is increase to raise the temperature. An insulator may be interposed between the outer cylinder 14 and the fixing member 72. Alternatively, a temperature of the fixing member may be measured to control a current value depending on the measured temperature.

INDUSTRIAL APPLICABILITY

The present invention is usable in any field of fabrication of bonded members, such as the space field (fabrication of rocket combustors), the aeronautical field and the plant-related fields.

EXPLANATION OF CODES

2: pulse generator
4: pressure
6: first metal material
8: second metal material
11: bonding
12: first metal material (inner cylinder)
13: pressure
14: second metal material (outer cylinder)
15: bonding surface
16: core
17: pressure-application direction
18: elastic member
20: electrode
22: pulse generator
24: re-fabrication line
26: fixing member
30: groove
32: valve
42: inner cylinder
44: outer cylinder
46: core
48: elastic member
50: electrode
51: pressure
52: pulse generator
53: pressure-application direction
54: fixing member
60: elastic member
61: pressure
62: electrode
63: pressure-application direction
64: core
66: pulse generator
70: temperature gauge
71: pressure
72: electrically-conductive fixing member
73: pressure-application direction

What is claimed is:
1. A pulse electric-current bonding method for bonding first and second metal materials whose bonding surfaces have a directional component parallel to a pressure-application direction, comprising:
fabricating a pressure surface of the first metal material having a first shape for receiving a pressure therethrough, to have a directional component parallel to the pressure-application direction and a directional component perpendicular to the pressure-application direction;
fabricating a pair of cores which have an electrical conductivity less than an electrical conductivity of the first and second metal materials, wherein at least one of the cores has a first surface along the pressure surface and a second surface perpendicular to the pressure-application direction;
assembling the first metal material, the second metal material and the pair of cores, together with an electrically-conductive elastic member having a contact surface perpendicular to the pressure-application direction, wherein the electrically-conductive elastic member is placed between the pair of cores to allow the contact surface to come into contact with the second surface to provide a space for displacement of the at least one of the cores within the first shape of the first material and to transmit a pressure to the pressure surface of the first material in a direction perpendicular to the pressure-application direction;
fixing the second metal material in a direction perpendicular to the pressure-application direction;
preparing a pulse electric-current bonding unit which comprises:
a pair of electrodes;
a pressure-applying device for applying a pressure to at least one of the paired electrodes while setting the pressure-application direction to a direction connecting between the paired electrodes; and
a voltage source for applying a pulse voltage between the paired electrodes, and
interposing an assembly comprising the first metal material, the second metal material, the pair of cores and the elastic member, between the paired electrodes; and applying the pulse voltage between the paired electrodes by the voltage source, while applying the pressure to at least one of the paired electrodes by the pressure-applying device, to bond the first metal material and the second metal material together.

2. The pulse electric-current bonding method as defined in claim 1, wherein an operation to bond is performed within a vacuum furnace.

3. The pulse electric-current bonding method as defined in claim 1, wherein fixing includes attaching a fixing member to a surface of the second metal material on a side opposite to the bonding surface thereof in a direction perpendicular to the pressure-application direction.

4. The pulse electric-current bonding method as defined in claim 3, wherein the fixing member is made of hard graphite.

5. The pulse electric-current bonding method as defined in claim 1, wherein the elastic member is made of elastic graphite.

6. The pulse electric-current bonding method as defined in claim 1, wherein the at least one of the cores is made of hard graphite.

7. A pulse electric-current bonding apparatus for bonding first and second metal materials whose bonding surfaces have a directional component parallel to a pressure-application direction, comprising:

a pair of electrodes;

a pressure-applying device for applying a pressure to at least one of the paired electrodes while setting the pressure-application direction to a direction connecting between the paired electrodes;

a voltage source for applying a pulse voltage between the paired electrodes; and an electrically-conductive elastic member, wherein:

a pair of cores and the electrically-conductive elastic member placed between the pair of cores are disposed between the paired electrodes, wherein at least one of the cores has a first surface to contact with the first metal material, the first metal material having a first shape, and a second surface perpendicular to the pressure-application direction such that the electrically-conductive elastic member comes into contact with the at least one of the cores through the second surface to provide a space for displacement of the at least one of the cores within the first shape of the first metal material and to transmit a pressure to the first material in a direction perpendicular to the pressure-application direction;

the at least one of the cores has a shape allowing the first surface to have a directional component parallel to the pressure-application direction and a directional component perpendicular to the pressure-application direction, and an electrical conductivity less than an electrical conductivity of the first and second metal materials; and the second metal material is fixed in the direction perpendicular to the pressure-application direction.

* * * * *